United States Patent [19]

Elsten

[11] Patent Number: 4,620,609

[45] Date of Patent: Nov. 4, 1986

[54] REMOVABLE BUMPER STEP FOR VEHICLES

[76] Inventor: Donald E. Elsten, 23 Gaineswood, Baxter Springs, Kans. 66713

[21] Appl. No.: 702,385

[22] Filed: Feb. 15, 1985

[51] Int. Cl.⁴ .............................................. B60R 3/00
[52] U.S. Cl. ..................................... 182/92; 280/163
[58] Field of Search ...................... 182/92, 120, 53–59; 280/163, 169; 248/236

[56] References Cited

U.S. PATENT DOCUMENTS

| | | | |
|---|---|---|---|
| 548,111 | 10/1895 | Cardarelli | 182/120 |
| 702,914 | 6/1902 | Boardman | 182/59 |
| 1,068,974 | 7/1913 | Brown | 182/59 |
| 1,450,353 | 4/1923 | Chapman | 182/58 |
| 1,534,895 | 4/1925 | Blackwood | 182/58 |
| 1,997,625 | 4/1935 | Billy | 182/59 |
| 2,781,081 | 2/1957 | Hynes | 182/59 |
| 3,159,242 | 12/1964 | James | 182/92 |
| 3,171,671 | 3/1965 | Cornett . | |
| 3,357,719 | 12/1967 | McCrea . | |
| 3,794,345 | 2/1974 | Locke . | |
| 3,980,319 | 9/1976 | Kirkpatrick . | |
| 4,056,270 | 11/1977 | Greenfield . | |
| 4,057,125 | 11/1977 | Kroft . | |
| 4,089,276 | 5/1978 | Enos . | |
| 4,102,432 | 7/1978 | Bustin . | |
| 4,159,122 | 6/1979 | Stevens . | |
| 4,191,388 | 3/1980 | Barksdale . | |
| 4,194,754 | 3/1980 | Hightower . | |
| 4,203,611 | 5/1980 | Makela . | |
| 4,405,141 | 9/1983 | Jurek | 182/120 |

Primary Examiner—Reinaldo P. Machado
Attorney, Agent, or Firm—Litman, Day and McMahon

[57] ABSTRACT

A removable bumper step for vehicles comprises a rigid plate having an upper, generally planar foot supporting surface terminating in a front end. The front end bends into a hook formation and is adapted to engage the upper edge of a vehicle bumper when the plate is positioned horizontally over the upper surface of the bumper. Means engaged with the plate adapt to contact the upper surface of the bumper rearwardly of the hook formation. The hook formation and means cooperate to maintain the plate in a horizontal attitude under the weight of a user. Varying vehicle bumper widths are accommodated by adjusting the means relative to the plate. Friction enhancing material adheres respectively to the foot supporting surface and the means. This material provides secure footing for a user, and stabilizes the engagement of the step to the vehicle bumper.

1 Claim, 5 Drawing Figures

U.S. Patent  Nov. 4, 1986  4,620,609
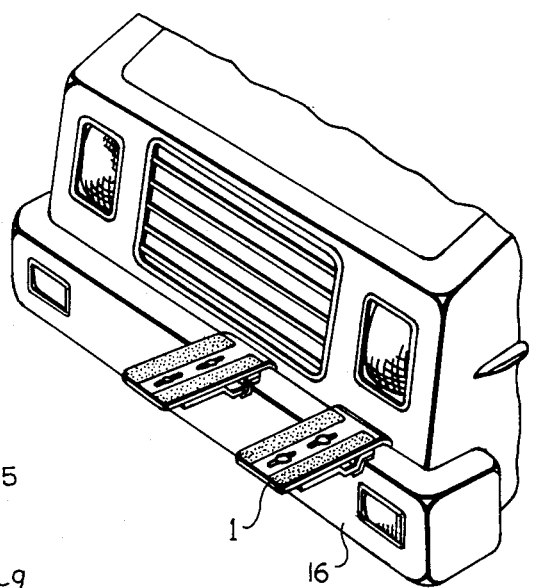
Fig.1.
Fig.2.
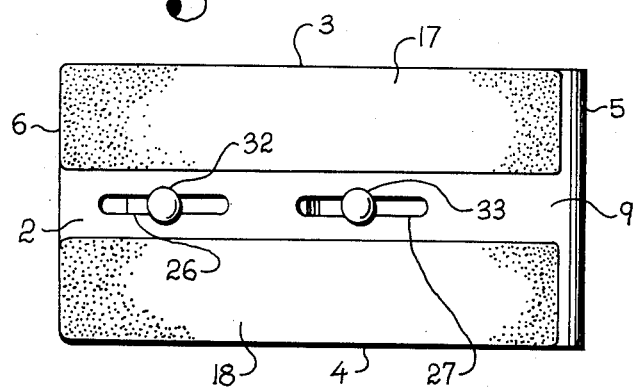
Fig.3.
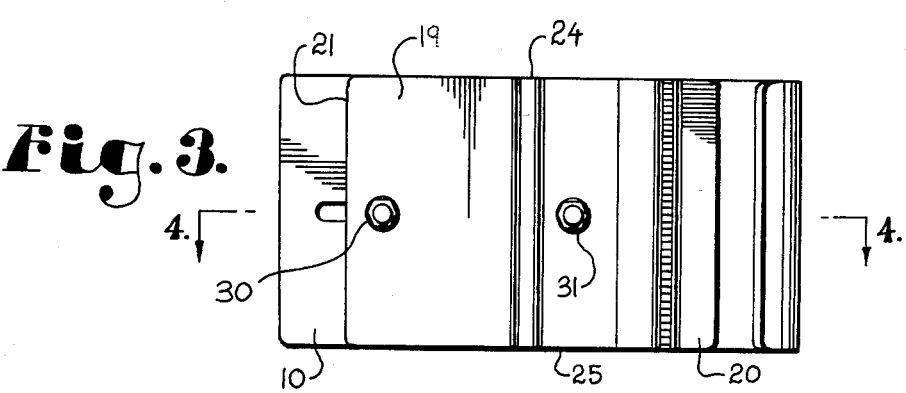
Fig.4.
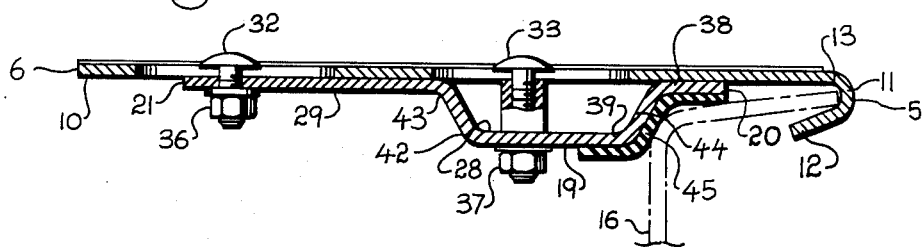
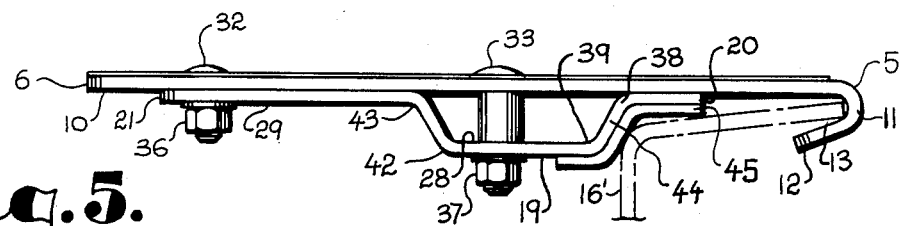
Fig.5.

REMOVABLE BUMPER STEP FOR VEHICLES

FIELD OF THE INVENTION

The present invention relates to removable bumper steps for vehicles, and in particular to a bumper step having a rigid plate with an upper, generally planar foot supporting surface. The front end of the plate bends into a hook adapted to engage the free upper edge of a vehicle bumper. Means adapted to contact the bumper rearwardly of the hook cooperate with it to maintain the plate in a horizontal position under weight. The step provides a secure platform for a user, and is compact for easy storage.

BACKGROUND OF THE INVENTION

Many vehicles, particularly trucks, vans, buses and the like, have a high profile relative to other vehicles such as private automobiles. The height of such vehicles makes the service and cleaning of them more difficult, and one doing such maintenance without mechanical assistance is often placed in an awkward and even dangerous circumstance by the general inaccessability of the engine compartment, windshield and cab.

A number of step devices have been designed in response to the foregoing problem. Some of these devices include individual steps that are intended for permanent fixture to a vehicle. Other such devices involve bench-type structures which may be designed for permanent association with a vehicle, or which may be partially portable. Still other designs disclose detachable individual steps that are intended for use with a particular vehicle.

Existing bumper step designs have various shortcomings. Naturally, those intended for permanent attachment have the effect of damaging the vehicle's appearance. Such permanent attachment may increase the incidence of rust and corrosion. Even those devices which are intended to be detachable are generally too bulky for convenient storage with a vehicle. Existing bumper step devices also are generally inflexible in their design. As a result, most are useful only in connection with a particular vehicle or style of vehicle. Many cannot be easily adjusted to the dimensions of a particular vehicle bumper.

OBJECTS OF THE INVENTION

Therefore, the principal objectives of the present invention are: to provide a removable bumper step for vehicles that is safe and convenient to use; to provide such a bumper step in which a rigid plate has an upper, generally planar foot supporting surface to provide a secure platform for a user; to provide such a bumper step wherein the foot supporting surface terminates in a front end, which bends downwardly and rearwardly into a hook formation; to provide such a bumper step wherein the hook formation is adapted to receive an upper, free edge of a vehicle bumper; to provide such a bumper step which has means engaged with the rigid plate and adapted to contact the upper surface of a vehicle bumper rearwardly of the hook formation; to provide such a bumper step in which the hook formation and the means cooperate to maintain the rigid plate in a horizontal attitude under the weight of a user; and to provide such a bumper step which is relatively inexpensive, easy to use and store, and relatively well adapted for the intended purpose.

Other objects and advantages of this invention will become apparent from the following description taken in conjunction with the accompanying drawings wherein are set forth, by way of illustration and example, certain embodiments of the invention.

The drawings constitute a part of this specification and include exemplary embodiments of the present invention and illustrate various objects and features thereof.

BRIEF DESCRIPTION OF THE DRAWINGS

FIG. 1 is a partial perspective view of the adjustable bumper of the present invention in use on a vehicle bumper.

FIG. 2 is a top plan view of the bumper step.

FIG. 3 is a bottom plan view of the bumper step.

FIG. 4 is a cross-sectional view of the bumper step, taken along line 4—4 of FIG. 3.

FIG. 5 is a side elevational view of the bumper step.

DETAILED DESCRIPTION OF THE INVENTION

As required, a detailed embodiment of the present invention is disclosed herein, however, it is to be understood that the disclosed embodiment is merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally indicates a removable bumper step illustrating the present invention. The illustrated bumper step 1 has a rigid plate 2. The plate 2 has elongate sides 3 and 4 and first and second ends 5 and 6. The plate 2 also has an upper surface 9 and a lower surface 10.

In the illustrated example, the first end 5 bends downwardly and rearwardly into a hook formation 11 extending therealong. The hook formation 11 includes a lip 12 adapted to engage an upper edge 13 of a vehicle bumper 16. When the hook formation 11 is engaged with a vehicle bumper 16, the second end 6 is distal from the bumper 16, and defines, with elongate sides 3 and 4, a generally planar foot supporting surface for a user. The upper surface 9 has sections 17 and 18 of friction enhancing material to provide secure footing.

Contacting means 19 slideably attaches to the lower surface 10 of the plate 2. Contacting means 19 has first and second ends 20 and 21 and elongate sides 24 and 25 that generally correspond to related characteristics of the plate 2. Contacting means 19 also has an upper surface 28 and a lower surface 29. In the illustrated example, the plate 2 has elongate openings 26 and 27 extending therethrough. The elongate openings 26 and 27 correspond to openings 30 and 31 extending through the contacting means 19. Fastening means, such as bolts 32 and 33, pass through related openings 26 and 30, and 27 and 31. Bolts 32 and 33 are secured in place by nuts 36 and 37. The elongate nature of openings 26 and 27 permits the contacting means 19 to be slideably adjusted to the width of a vehicle bumper 16.

The first end 20 of contacting means 19 is proximal to the hook formation 11 of the plate 2. The first end 20 extends outwardly from the bumper 16 to a first angle 38, which turns downwardly from the lower surface 10 of the plate 2 and extends to a second angle 39. The second angle 39 turns parallel to the plane of the plate 2, and continues outwardly from the vehicle bumper 16 to a third angle 42. The third angle 42 turns generally away from the vehicle bumper 16 and upward toward the plate 2, and extends to a fourth angle 43. The fourth angle 43 turns away from the bumper 16 in a plane parallel to that of the plate 2, and extends to the second end 21 of the contacting means 19.

Extending between the first angle 38 and the second angle 39, and defined thereby, is a shoulder area 44. A section 45 of resilient material adheres to the lower surface 29 of the contacting means 19, and covers generally its first end 20, the first and second angles 38 and 39, and the shoulder area 44.

In use, the nuts 36 and 37 are loosened and the contacting means 19 is moved toward the second end 6 of the plate 2. The plate 2 is maneuvered relative to the vehicle bumper 16 until the lip 12 of the hook formation 11 is securely engaged with the upper edge 13 of the bumper 16. The user then adjusts the contacting means 19 toward the first end 5 of the plate 2, until the shoulder area 44 engages the vehicle bumper 16. The user compresses the shoulder area 44 against the bumper 16 until a binding engagement of the bumper step 1 with the bumper 16 is made. The nuts 36 and 37 are tightened to provide a secure platform for the user. The adjustment of the contacting means 19 to accomodate a bumper 16' having a somewhat extended horizontal aspect is shown in FIG. 5.

When not in use, the bumper step 1 is easily demounted from the vehicle bumper 16 by loosening the nuts 36 and 37 and sliding the contacting means 19 outwardly until its engagement with the bumper 16 is released. The bumper step 1 may be stored in a glove compartment or the like.

It is to be understood that while certain forms of the present invention have been illustrated and described herein, it is not to be limited to the specific forms or arrangement of parts described and shown.

What is claimed and desired to be secured by Letters Patent is as follows:

1. A removable bumper step for vehicles having a bumper with an upper, generally horizontal surface and a free upper edge projecting toward the body of the vehicle, said step comprising:
   (a) a rigid upper plate having an upper, generally planar foot supporting surface and a lower surface, said upper plate terminating in a front end;
   (b) said plate front end being bent downwardly and rearwardly into a hook configuration adapted to engage said bumper free edge when said plate is extending generally horizontally over said bumper upper surface;
   (c) a rigid lower plate engaged with said upper plate;
   (d) said lower plate having a forward end portion, a central portion, and a rearward end portion integrally connected;
   (e) said lower plate first end portion contacting said upper plate lower surface rearwardly of said hook configuration, said lower plate rearward end portion contacting said upper plate lower surface rearwardly of said central portion, said lower plate central portion being spaced downwardly from said upper plate lower surface, whereby said upper plate and said lower plate central portion define a central cavity;
   (f) said upper plate having first and second openings extending therethrough and longitudinally thereof;
   (g) spacer means in said central cavity and having opposite ends contacting said upper plate lower surface and said lower plate central portion;
   (h) first fastener means received in said first opening and extending through said spacer means and said lower plate central portion for adjustably securing said upper plate and said lower plate in a fixed position with respect to said bumper; and
   (i) second fastener means received in said second opening and extending through said upper plate and said lower plate rearward end portion for adjustably securing said upper plate and said lower plate in a fixed position with respect to each other.

* * * * *